United States Patent
Haas et al.

(10) Patent No.: US 7,964,315 B2
(45) Date of Patent: Jun. 21, 2011

(54) SHUTDOWN METHODS AND DESIGNS FOR FUEL CELL STACKS

(75) Inventors: Herwig R Haas, Vancouver (CA); Cara N Startek, Vancouver (CA); Michael P Sexsmith, North Vancouver (CA); Andrew J DeSouza, Delta (CA); Kelvin K Fong, Burnaby (CA)

(73) Assignee: BDF IP Holdings Ltd., Vancouver, BC (CA)

( * ) Notice: Subject to any disclaimer, the term of this patent is extended or adjusted under 35 U.S.C. 154(b) by 1069 days.

(21) Appl. No.: 10/571,417

(22) PCT Filed: Sep. 10, 2004

(86) PCT No.: PCT/US2004/029905
§ 371 (c)(1),
(2), (4) Date: May 4, 2007

(87) PCT Pub. No.: WO2005/029617
PCT Pub. Date: Mar. 31, 2005

(65) Prior Publication Data
US 2007/0248847 A1    Oct. 25, 2007

Related U.S. Application Data

(60) Provisional application No. 60/608,934, filed on Sep. 12, 2003.

(51) Int. Cl.
*H01M 8/04* (2006.01)

(52) U.S. Cl. .......................... 429/429; 429/433; 429/442

(58) Field of Classification Search .................. None
See application file for complete search history.

(56) References Cited

U.S. PATENT DOCUMENTS

| | | | |
|---|---|---|---|
| 2002/0076582 | A1 | 6/2002 | Reiser et al. |
| 2002/0076583 | A1 | 6/2002 | Reiser et al. |
| 2003/0031899 | A1 | 2/2003 | Margiott et al. |
| 2004/0001981 | A1 | 1/2004 | Resnick et al. |

(Continued)

FOREIGN PATENT DOCUMENTS

CA    2 379 363 A1    9/2002

(Continued)

OTHER PUBLICATIONS

Machine translation of JP 2001-015138, Jan. 2001.*

*Primary Examiner* — Jonathan Crepeau
(74) *Attorney, Agent, or Firm* — Seed IP Law Group PLLC

(57) ABSTRACT

Improved water distribution can be obtained within the cells of a fuel cell series stack by maintaining a suitable temperature difference between the cathode and anode sides of each cell in the stack during shutdown. A method of shutting down a fuel cell stack having at least two fuel cells stacked in series, each fuel cell having a cathode side and an anode side, the method comprising: stopped the generation of electricity from the stack; allowing the stack to cool over a cooldown period; and maintaining a temperature difference between the cathode side and the anode side of each fuel cell during the cooldown period, wherein the direction of the temperature difference in each fuel cell is the same. The fuel cell stack may comprise coolant channels, Peltier devices and anode and cathode reactant flow fields.

20 Claims, 4 Drawing Sheets

U.S. PATENT DOCUMENTS

2004/0029905 A1   2/2004   Christoph

FOREIGN PATENT DOCUMENTS

| | | |
|---|---|---|
| JP | 08-306380 A | 11/1996 |
| JP | 9-312165 A | 12/1997 |
| JP | 2001-015138 A | 1/2001 |
| KR | 10-2003-0084321 * | 11/2003 |
| WO | WO 00/65676 A1 | 11/2000 |
| WO | WO 2004/107839 A2 | 12/2004 |
| WO | WO 2004/109822 A2 | 12/2004 |
| WO | WO 2005/029617 A2 | 3/2005 |

* cited by examiner

SHUTDOWN METHODS AND DESIGNS FOR FUEL CELL STACKS

BACKGROUND OF THE INVENTION

1. Field of the Invention

The invention relates to methods and designs for obtaining improved water distribution within the cells of a fuel cell series stack during shutdown and, more particularly, to the shutdown of solid polymer electrolyte fuel cell stacks.

2. Description of the Prior Art

Fuel cell systems are presently being developed for use as power supplies in a wide variety of applications, such as stationary power plants and portable power units. Such systems offer the promise of economically delivering power while providing environmental benefits.

Fuel cells convert fuel and oxidant reactants to generate electric power and reaction products. They generally employ an electrolyte disposed between cathode and anode electrodes. A catalyst typically induces the desired electrochemical reactions at the electrodes.

A preferred fuel cell type, particularly for portable and motive applications, is the solid polymer electrolyte (SPE) fuel cell which comprises a solid polymer electrolyte membrane and operates at relatively low temperatures.

SPE fuel cells employ a membrane electrode assembly (MEA) which comprises the solid polymer electrolyte or ion-exchange membrane disposed between the cathode and anode. Each electrode contains a catalyst layer, comprising an appropriate catalyst, located next to the solid polymer electrolyte membrane. The catalyst is typically a precious metal composition (e.g., platinum metal black or an alloy thereof) and may be provided on a suitable support (e.g., fine platinum particles supported on a carbon black support). The catalyst layers may contain an ionomer similar to that used for the solid polymer electrolyte membrane (e.g., Nafion®). The electrodes may also contain a porous, electrically conductive substrate that may be employed for purposes of mechanical support, electrical conduction, and/or reactant distribution, thus serving as a fluid diffusion layer. Flow field plates for directing the reactants across one surface of each electrode or electrode substrate, are disposed on each side of the MEA. In operation, the output voltage of an individual fuel cell under load is generally below one volt. Therefore, in order to provide greater output voltage, numerous cells are usually stacked together and are connected in series to create a higher voltage fuel cell series stack.

During normal operation of a SPE fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The electrons travel through an external circuit providing useable power and then react with the protons and oxidant at the cathode catalyst to generate water reaction product.

In some fuel cell applications, the demand for power can essentially be continuous and thus the stack may rarely be shutdown (such as for maintenance). However, in many applications (e.g., automotive), a fuel cell stack may frequently be stopped and restarted with significant storage periods in between. Such cyclic use can pose certain problems in SPE fuel cell stacks. For instance, in U.S. Patent Application Publication Nos. US 2002/0076582 and US 2002/0076583, it is disclosed how conditions leading to cathode corrosion can arise during startup and shutdown and that corrosion may be reduced by rapidly purging the anode flow field with an appropriate fluid.

Other problems that can arise from cyclic use relate to the water content remaining and its distribution in the stack after shutdown. For instance, liquid water accumulations in the stack can result from too much water remaining and/or undesirable distribution during shutdown. Such accumulations of liquid water can adversely affect cell performance by blocking the flow of reactants and/or by-products. Perhaps even worse, if the fuel cell stack is stored at below freezing temperatures, liquid water accumulations in the cells can freeze and possibly result in permanent damage to the cells. On the other hand, with too little water remaining, the conductivity of the membrane electrolyte can be substantially reduced, with resulting poor power capability from the stack when restarting.

Given these difficulties, there remains a need in the art to develop procedures and/or design modifications in order to obtain improved water distribution in fuel cell stacks during shutdown and storage. The present invention addresses these and other needs, and provides further related advantages.

BRIEF SUMMARY OF THE INVENTION

It has been discovered that a desirable water distribution can be obtained in a fuel cell series stack after shutdown by ensuring that an appropriate temperature difference is maintained across the cells in the stack as it cools during the shutdown. In this way, for instance, the remaining water in a solid polymer electrolyte fuel cell stack can be concentrated in a selected set of colder flow fields and dealt with appropriately, while still maintaining sufficient water in the membrane electrolyte for purposes of conductivity.

Specifically, the method of the invention applies to a fuel cell series stack which has at least two cells and typically a plurality of cells stacked in series. The method is particularly suitable for solid polymer electrolyte fuel cell series stacks. The shutdown method comprises stopping the generation of electricity from the stack, and allowing the stack to cool in a controlled manner over a certain period (i.e., a cooling period) in which a temperature difference is maintained between the cathode and anode sides of each cell in the stack and the direction of the temperature difference in each of the cells is the same. That is, either the cathode is hotter than the anode in each cell during the cooldown period or vice versa. With this approach, the water in each cell generally migrates to the colder side during cooldown.

A suitable shutdown method involves maintaining substantially the same absolute temperatures and temperature difference within each cell during the cooldown period (e.g., the cathode side temperature in each cell is about the same and the anode side temperature in each cell is about the same). The resulting temperature profile between the two ends of the stack will then resemble a sawtooth shape with each cell temperature profile corresponding to a tooth. Such a profile may be obtained by thermally insulating each cell from adjacent fuel cells in the stack (e.g., by increasing the thermal resistance between each pair of cells) and by modestly cooling a selected set of electrodes (e.g., cooling a set of electrodes immediately adjacent to coolant channels in the stack).

An alternative shutdown method involves maintaining a monotonically decreasing temperature across groups of fuel cells in the stack during the cooldown period. That is, each group of fuel cells has a hot side and a cold side, the temperatures of the fuel cells in each group decrease monotonically across the group between the hot side and the cold side during the cooldown period, and the temperatures of, and the temperature difference between, the hot side and the cold side of each group during the cooldown period are substantially the same. Again, the resulting temperature profile between the two ends of the stack will resemble a sawtooth shape although here, the temperature profile of a group of cells corresponds to a tooth. Such a profile may be obtained for instance by incorporating Peltier devices between groups of cells. Each Peltier device serves to cool the "cold" side of one cell group while it heats the "hot" side of the adjacent cell group.

Yet another alternative shutdown method involves maintaining a monotonically decreasing temperature across the entire stack during the cooldown period. Such a profile may be obtained by heating the "hot" end of the stack or perhaps merely by thermally insulating the "hot" end of the stack in order to keep it sufficiently hot. Alternatively, such a profile may be obtained by suitably cooling the "cold" end of the stack.

A typical stack may be at a temperature greater than about 70° C. prior to shutdown and thus prior to the cooldown period. The cooldown period may need to last until the stack temperature is less than about 40° C. at the colder end. An effective temperature difference during the cooling period is about or just greater than 1° C. per cell and an effective cooldown period can be about or greater than about 20 minutes. However, smaller temperature differences and/or shorter cooldown times can also be expected to be effective.

The fuel cells in a typical SPE stack comprise cathode and anode reactant flow fields and the method can allow for water to be concentrated in either set of flow fields (e.g., cathode side) during shutdown. Depending on the specific embodiment and operating conditions, these reactant flow fields may or may not desirably be purged during the cooldown period.

DETAILED DESCRIPTION OF THE INVENTION

Figure 1:
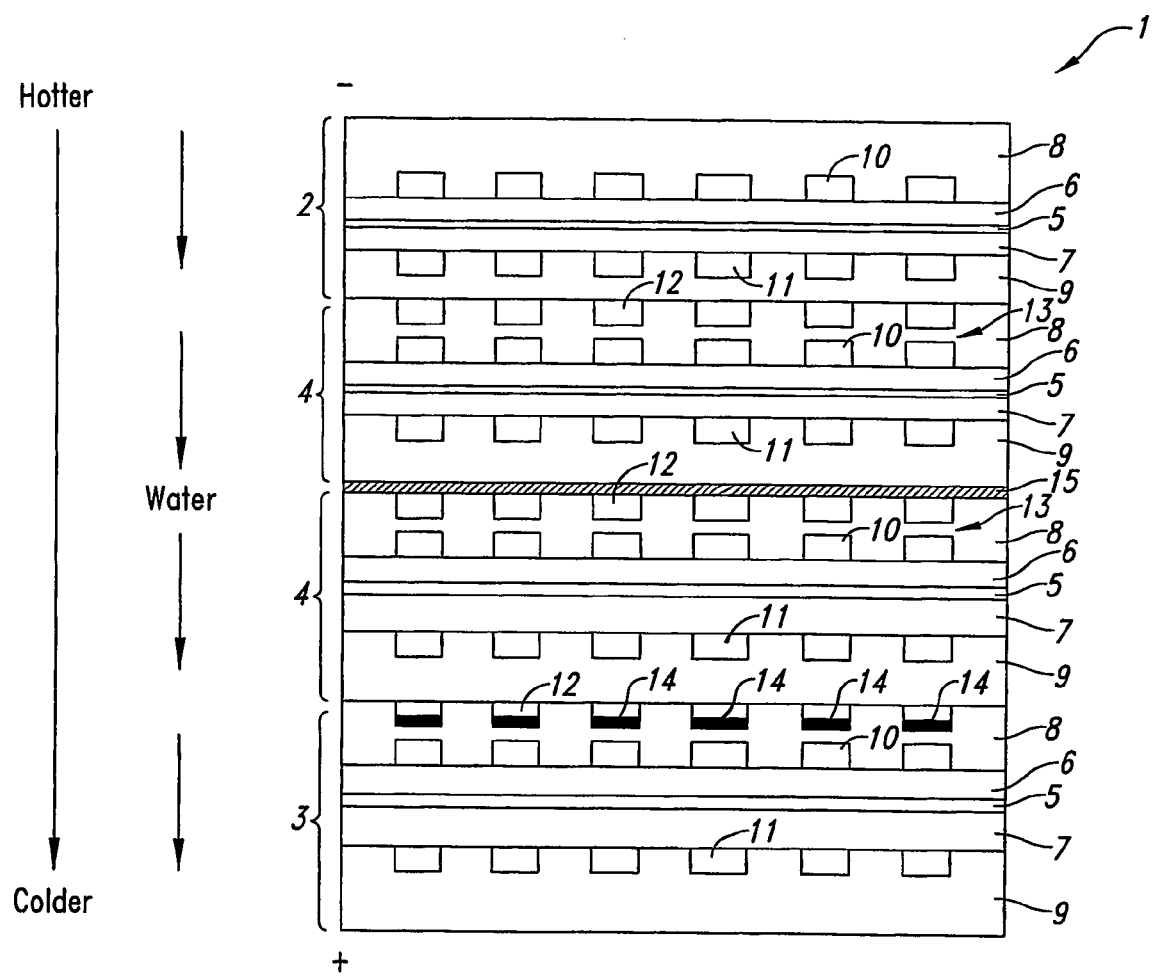
FIG. 1 shows a schematic diagram of a solid polymer electrolyte fuel cell series stack and the direction of water flow within the cells when subjected to a temperature difference.

The shutdown method of the invention is particularly useful for achieving a desired water distribution in a SPE fuel cell stack. An exemplary SPE fuel cell stack is shown schematically in FIG. 1. Stack 1 comprises a plurality of stacked cells including end cells 2 and 3 at the negative and positive ends of stack 1, respectively. In between are a plurality of cells 4 (for simplicity only two in-between cells are depicted in FIG. 1). Each cell comprises a solid polymer electrolyte membrane 5. Suitable catalyst layers (not shown) serve as the anode and cathode in each cell and are applied to opposing faces of each membrane 5. Each cell also comprises an anode gas diffusion layer 6 and a cathode gas diffusion layer 7. And, adjacent to the gas diffusion layers 6 and 7 in each cell are an anode flow field plate 8 and a cathode flow field plate 9, respectively. Each plate comprises anode flow field channels 10 and cathode flow field channels 11, respectively. As depicted, each anode flow field plate 8 (other than that in end cell 2) also contains coolant flow field channels 12. Typically, negative and positive bus plates (not shown) and a pair of compression plates (not shown) are also provided at either end of the stack. Fluids are supplied to and from the reactant and coolant flow fields via various ports and manifolds (not shown).

In the method of the invention, a temperature difference is maintained between the anode and cathode side of each cell in stack 1 over a cooldown period when the stack is shutdown. In FIG. 1, the temperature depicted decreases from anode to cathode. The exposure to such a difference over a suitable period of time results in a significant movement of water within each cell (via a distillation and condensation mechanism), with the transfer going from the anode to the cathode side. With such a temperature difference, most of the transferred water collects in the cathode flow fields 11, although enough water can remain in the electrolyte membranes 5 to keep the ionic conductivity at a satisfactory level. Once the cooldown period is over, the stack is typically allowed to equilibrate to ambient temperature.

As illustrated in FIG. 1 and in the following Examples, water is collected in the cathode flow fields of the SPE fuel cell stacks during shutdown. This is desirable when the stack design is such that the water collected at the cathode side can be accommodated without blocking the cathode flow fields and when the collected water isn't a problem with regard to freezing during storage. It may also be desired if the cathode flow field is readily drained or is readily purged via some appropriate means (e.g., such as with an inert gas) during shutdown, thereby removing the collected water. However, due to differences in construction and/or operation (e.g., if anode purging were employed during shutdown), it may instead be desired in other stack embodiments to direct the water to the anode side during shutdown, thus making an opposite direction for the temperature difference preferred.

In conventional fuel cell stacks, the stack ends typically cool somewhat faster than the remainder of the stack and thus the temperature profile across the stack during cooldown is not monotonic nor is the temperature difference across each cell in the same direction. Thus, to achieve the desired temperature difference, either the stack temperature must be controlled appropriately during shutdown or modifications must be made to the cell and/or stack structures.

In one embodiment, a similar temperature profile may be established over each cell during the cooldown period (i. e., each anode flow field plate temperature is about the same and each cathode flow field plate temperature is similar). This may be achieved for instance by using the coolant in coolant channels 12 to cool each cathode flow field plate 9 slightly more than each anode flow field plate 8 during shutdown. The temperature of a representative "hotter" part of the stack may be monitored and used to control and ramp down the temperature of the flowing coolant appropriately such that the anode flow field plates 8 are always just warmer than the cathode flow field plates 9.

In order for a desired temperature difference to exist between anode flow field channels 10 and adjacent cathode flow field channels 11, it may be necessary to increase the thermal resistance between each pair of cells. In FIG. 1, the thermal resistance might be increased by modifying the anode flow field plates 8 in planar regions 13 which separate the anode flow field channels 10 from coolant channels 12. The modifications may include increasing the separation of channels 10 from channels 12, or introducing insulating voids in regions 13, or employing different materials in regions 13 with greater thermal resistance than that in the rest of plates 8. Alternatively, the thermal resistance might be increased by lining a side of coolant channels 12 with thermal insulating liners 14 made of a material with greater thermal resistance than that in the rest of plates 8. Either way, the coolant in coolant channels 12 would more readily cool cathode flow field channels 11 than anode flow field channels 10 thus causing water to collect in the former.

In another embodiment, a monotonically decreasing temperature is maintained across groups of cells in the stack during the cooldown period. Here, each group has a hot and cold side and the temperature decreases monotonically from the hot side to the cold side. Groups of cells that can be cooled in this manner may be created by incorporating Peltier devices between the desired groups. The Peltier device 15 depicted in FIG. 1 for instance defines two groups of cells, an upper pair and a lower pair. Peltier device 15 cools the cathode flow field plate 9 immediately above it and heats the anode flow field plate 8 immediately below it.

In yet another embodiment, a monotonically decreasing temperature is maintained across the entire stack during the cooldown period. Such a temperature profile may be obtained in a stack equipped with a heater at the desired "hot" end (e.g., at anode flow field plate 8 in end cell 2) by controlling the heater output appropriately while the other end of the stack (e.g., end cell 3) naturally cools when power production stops. A suitable starting temperature difference can be established in this manner. Then the stack can be cooled so as to maintain a monotonically decreasing temperature across it by ramping down the temperature of the heater appropriately. It may be useful to monitor the stack temperature at one or more points and use this information to control the heater output. In other embodiments, thermal insulation alone might substitute for the heater at the "hot" end. During cooldown, the insulation would have to be sufficient to retain enough heat so as to establish the desired difference while the other end of the stack naturally cooled. Further still, cooling at the "cold" end may also be controlled (e.g., via Peltier devices or by flowing coolant).

In selecting which of the above or other possible embodiments to use in a given application, consideration should be given to the structure of the fuel cell stack and its normal operating conditions. For instance, temperature differences of the order of 1° C. per cell may be effective in distributing the water within the cells in reasonable timeframes (e.g., minutes). In stacks having only a few cells, maintaining a monotonically decreasing temperature over the entire stack during shutdown may then be a preferred option. However, this approach is impractical for stacks comprising more than a hundred cells. In this case, the temperature difference required across the entire stack would then have to be of order of 100° C., a value perhaps greater than the typical stack operating temperature. Thus here, an alternative approach may need to be selected instead (e.g., applying a similar absolute temperature profile across each cell during shutdown). The direction of the temperature difference during the cooldown period is of course selected according to where liquid water is preferably collected during shutdown (e.g., either cathode or anode flow field channels). This water may desirably be purged from the stack as part of the shutdown procedure. The duration of the cooldown period and cooling rate are chosen such that water has sufficient opportunity to migrate within the cell. Those skilled in the art can be expected to select an appropriate method and cell/stack modifications to suit a given application.

The following examples are provided to illustrate certain aspects and embodiments of the invention but should not be construed as limiting in any way.

EXAMPLES

Example 1

Two high aspect ratio SPE fuel cells were made in which the MEAs comprised NAFION® N112 perfluorosulfonic acid membrane electrolyte with carbon supported Pt/Ru catalyst applied on one face and carbon supported Pt catalyst on the other face to serve as anode and cathode electrodes respectively. The MEAs also comprised polytetrafluoroethylene (PTFE) impregnated carbon fiber paper substrates to serve as gas diffusion layers on each side of the catalyst coated membrane electrolyte. Grafoil® graphite reactant flow field plates with linear flow channels formed therein were located on either side of the MEAs, thereby completing the fuel cell assembly.

For testing purposes, independently controllable electrically heated bus plates were placed on each side and the cells were initially operated on hydrogen and air reactants at 70° C. Then the flow resistance of the hydrogen fuel in the anode flow field plate was measured as a function of temperature difference across the cells. The temperature difference was varied from −5° C. (anode colder than cathode) to +8° C. (anode warmer than cathode) by varying the cathode side heater appropriately while leaving the anode side temperature constant. Table 1 below shows the results from the three cells tested.

TABLE 1

| Temperature of anode relative to cathode (° C.) | Flow resistance (Kpa/SLPM) cell 1 | Flow resistance (Kpa/SLPM) cell 2 | Flow resistance (Kpa/SLPM) cell 3 |
| --- | --- | --- | --- |
| +8 | 12 | 10 | 14 |
| −2 | 15 | 13 | 18 |
| −3 | 15 | 20 | 38 |
| −5 | 27 | 27 | NA |

As is apparent from Table 1, the anode flow resistance was relatively low and acceptable when the anode was hotter than the cathode. However, when the anode was colder than the cathode, the flow resistance varied significantly and was generally undesirably high. It is believed that the increase in flow resistance results from liquid water collecting in the anode flow fields. This Example illustrates how obtaining a desired water distribution (in which blockage of the anode flow field is avoided) may be affected by the temperature difference across the MEA.

Example 2

A fuel cell assembly similar to those of Example 1 was prepared in which about 6 g of water was applied to the cathode flow field plate but the anode side was dry. The membrane electrolyte contained about 5% absorbed water by weight (equilibrium level at room temperature and humidity conditions). The wet cathode side of the cell assembly was then placed on a hot plate set at 70° C. and the anode side insulated such that the anode flow field plate was about 2° C. colder than the cathode flow field plate. In this arrangement, water transfers from the cathode side to the anode side of the cell and accumulates at the anode plate. The rate of water transfer from the cathode to the anode side was then determined via weight gain measurements of the anode plate. (The cell was removed and allowed to cool for about 30 seconds before each weight measurement of the anode plate). The test was repeated without using insulation on the anode side such that now the anode flow field plate was about 4° C. colder than the cathode flow field plate.

Figure 2A:
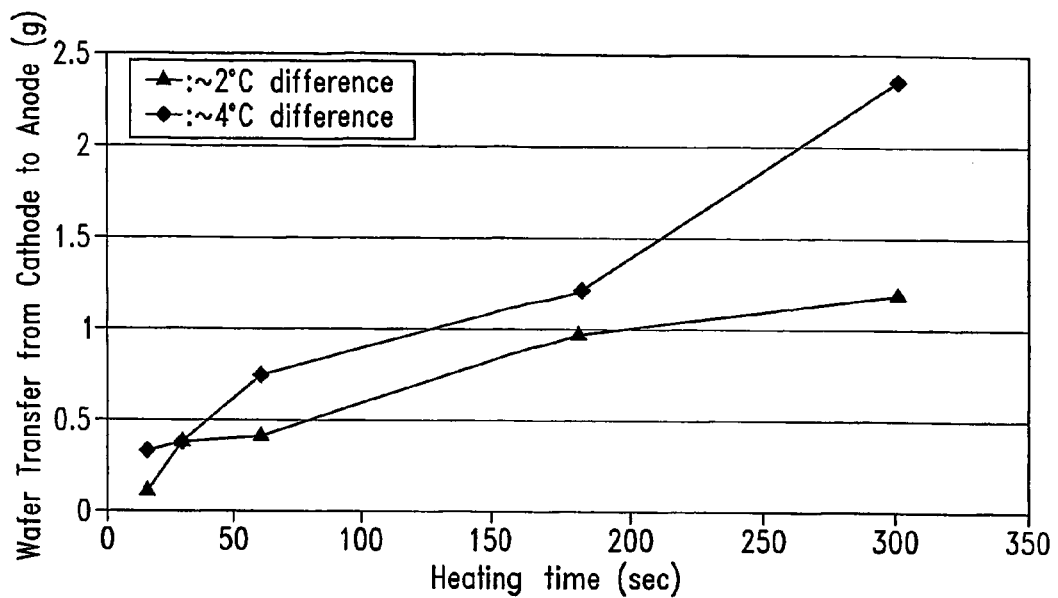
FIG. 2a shows the water transmission characteristics through a MEA as a function of time with two different temperature differences across the MEA.

FIG. 2a shows the rate of water transfer through the MEA as a function of time with these two different temperature differences across the MEA. In both cases, a roughly constant rate of water transfer is observed suggesting that water transfer is driven by a concentration gradient.

A fuel cell assembly similar to those of Example 1 was again prepared in which water was applied to the cathode flow field plate and the anode side was dry. This time, the rate of water transfer was measured after 1 minute of heating at different cell temperatures using the electrical heating apparatus of Example 1. Here, the cathode flow field plate was kept hotter than the anode by a constant 5° C. Again, weight gain of the anode plate was determined. (To avoid water loss from evaporation at the higher temperatures here, the anode plate was quickly clamped to a condenser plate and both plates were weighed.)

Figure 2B:
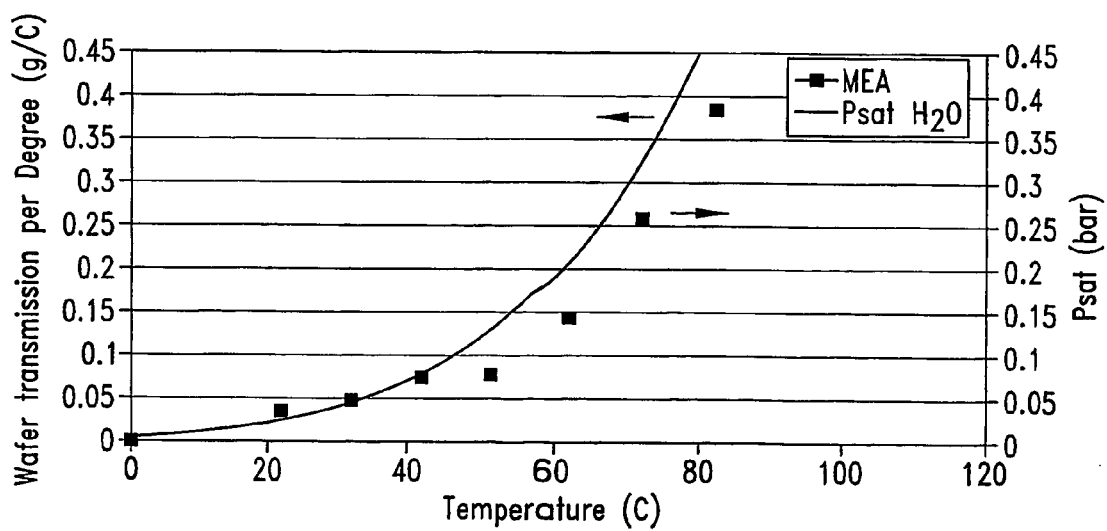
FIG. 2b shows the water transmission characteristics through a MEA as a function of temperature with a constant temperature difference across the MEA.

FIG. 2b shows the rate of water transmission in g per ° C. through the MEA as a function of temperature. The temperature of the cathode plate is plotted on the X axis. FIG. 2b also shows the water saturation pressure as a function of temperature. Both plots show a similar shape. With increasing temperature, both the concentration gradient and the rate of diffusion for water through the membrane increase.

This Example provides some quantitative information about water transfer characteristics through conventional MEAs.

Example 3

A fuel cell assembly similar to that of Example 1 was prepared with two circular pieces cut out of the MEA. The MEA was wetted and the weight of the gas diffusion layers and the catalyst coated membrane in these cutout pieces was determined. The weights of a wetted anode flow field plate and a dry cathode flow field plate were also determined and a fuel cell assembly was prepared by placing the MEA (including the cutout circular pieces) between the plates. A temperature difference of about 2-3° C. was applied across the fuel cell assembly (with anode hotter) for about 20 minutes at 60° C. using the heating apparatus of Example 1. Thereafter, the fuel cell assembly was disassembled and the weights of the various components measured again. The weight of water in each component before and after exposure to the temperature difference was then calculated by subtracting the known dry weight of each component. The results appear in Table 2.

TABLE 2

|  | Cathode flow field plate | Cathode gas diffusion layer | Catalyst coated membrane | Anode gas diffusion layer | Anode flow field plate |
|---|---|---|---|---|---|
| Weight of water before (g) | 0 | 0.88 | 0.55 | 0.08 | 2.63 |
| Weight of water after (g) | 2.77 | −0.01 | 0.3 | −0.02 | 0 |

(The slight negative values appearing in Table 2 result from experimental error.)

Exposure to the temperature difference has caused the water at the anode flow field plate to migrate to the cathode flow field plate. The anode flow field plate and anode and cathode gas diffusion layers are completely dry. Purging with a dry gas was not required to dry these components. However, the catalyst coated membrane still retained an amount of water that is expected to provide sufficient membrane conductivity for starting up the fuel cell. (Those skilled in the art will appreciate that greater membrane hydration may be desired, and thus engineered in on shutdown, depending on the desired startup capability of the fuel cell stack.)

This example demonstrates that application of a modest temperature difference can significantly move the water within a cell to desirable locations.

Example 4

A series stack was prepared using 30 fuel cells similar to those in Example 1. In each cell, the anode flow field plates were wetted with about 3-4 g of water prior to assembly. Thermal insulation (foam) was wrapped all around the stack and independently controllable electrically heated bus plates were placed on each end of the stack. The stack was then used to compare water distribution results after an inventive cooldown method to those after a conventional cooldown procedure.

Figure 3A:
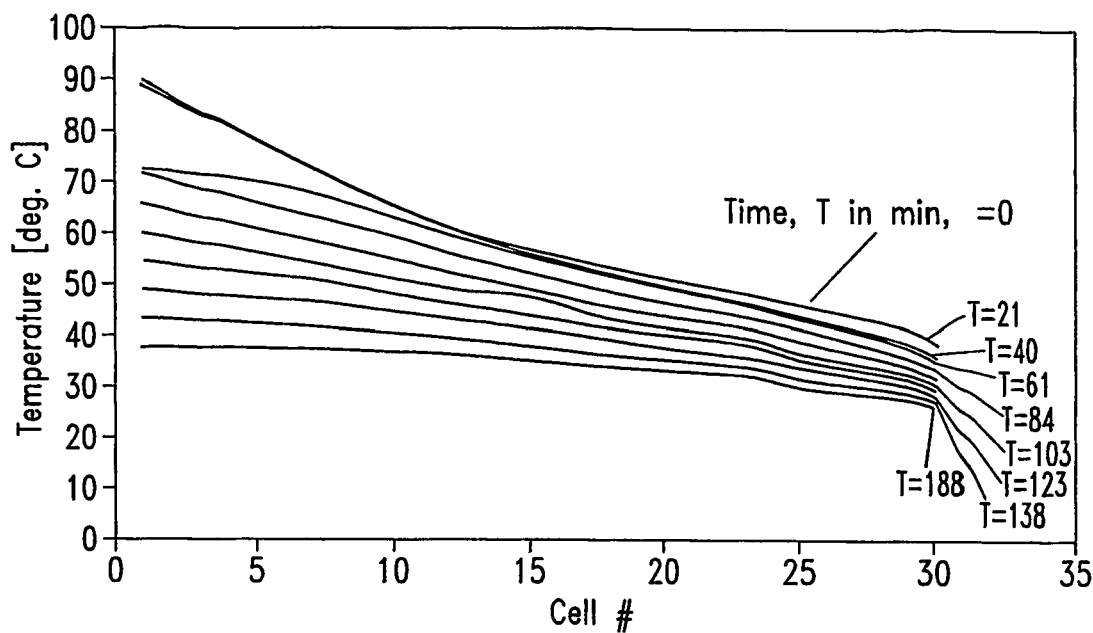
FIG. 3a shows the temperature profile across the fuel cell stack of Example 4 when cooled down according to a method of the invention.
Figure 3B:
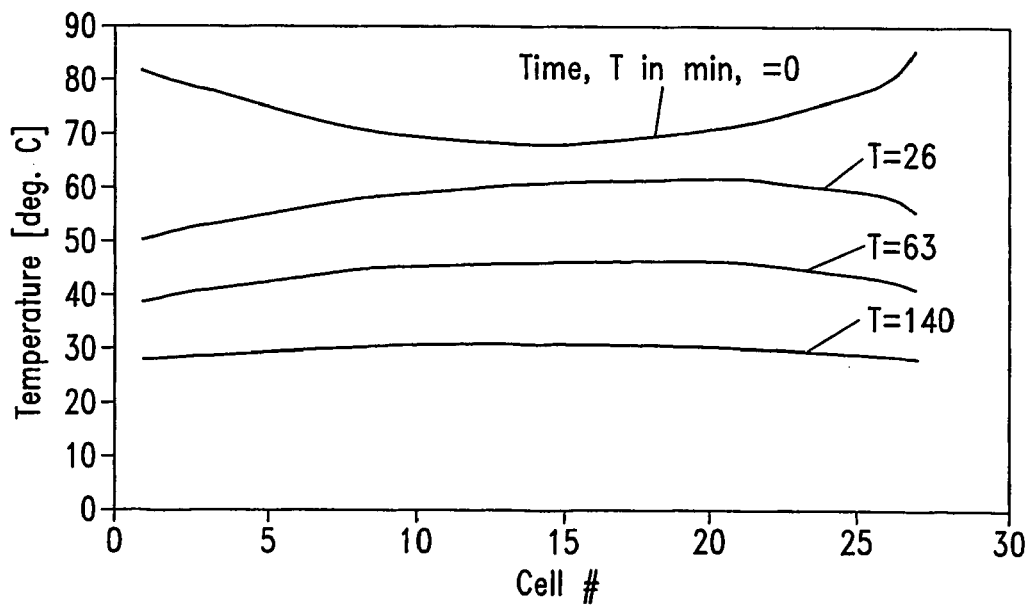
FIG. 3b shows the temperature profile across the fuel cell stack of Example 4 when cooled down in a conventional manner.

A cooldown method illustrative of the invention was achieved by heating the anode end of the stack to 80° C. and the cathode end to 50° C. using the heaters. Once equilibrium was obtained, the cathode side heater was turned off to improve the temperature difference across the stack. Then, the cooldown simply involved reducing the anode side temperature gradually with time. FIG. 3a shows the temperature profile across the fuel cell stack at various times during the cooldown. Here, a monotonically decreasing temperature is maintained across the stack during the cooldown period. When the stack had cooled to about 30° C., it was disassembled and analyzed for water distribution. The analyses involved: (1) visually estimating the amount of water in the anode and cathode flow field plates; (2) measuring the weight of water in the whole MEAs; and (3) measuring the weight of water in sample MEA components (obtained from several circular pieces cut from the MEA as in Example 3). For comparison purposes, the stack was re-made as above but this time was heated up to 80° C. at both the cathode and anode ends. Once equilibrium was obtained, the heaters were simply turned off. Thereafter, a conventional cooldown followed as the stack lost heat naturally to the surrounding environment. FIG. 3b shows the temperature profile across the fuel cell stack at various times during this conventional manner. Here, the ends of the stack cool more quickly than the cells in between and a convex shaped temperature profile is observed.

The water distributions were markedly different between the two cooldown procedures. Visually, the amount of liquid water on the anode plates essentially all seemed to have transferred to the cathode plates when the stack was cooled by the inventive method. However, when cooled via the conventional method, the amount of water on each of the cathode and anode plates was highly variable. Some cathode plates had significant amounts of water while in other cells the anode plates had most of the liquid water. The MEAs obtained from cells cooled in the conventional manner had more water (from about 0.5 to 1.5 g) than MEAs from cells cooled using the inventive method (from about 0.4 to 1.1 g). However, in both cases, this is a suitable amount of water for membrane electrolyte conductivity (the estimated maximum water content for the electrolyte in each cell was about 0.6-0.8 g). Finally, as expected from the results from the whole MEAs, the membrane electrolytes within the MEAs contain more water after the conventional cooldown than their counterparts after the inventive cooldown. Further, liquid water was found in certain gas diffusion layers following conventional cooldown but not following the inventive cooldown. As mentioned previously, the presence of liquid water can pose a problem if the cell is to be stored below 0° C.

This Example shows that the advantages of the inventive method over conventional cooldown by desirably distributing water within a fuel cell stack.

Example 5

A series stack was prepared using 10 fuel cells similar to those in Example 1. An electric heater was mounted adjacent to the cathode end of the stack. The stack was then operated at steady state under conventional "wet" conditions (i.e. current density of 1 A/cm$^2$, 60° C. operating temperature, and hydrogen and air reactants both supplied at 29 psi and dewpoints of 64° C., and at stoichiometries of 1.7 and 1.5 respectively) for one hour. The load was then removed and the reactant supplies turned off. Next, the heater was turned on for 4.5 hours at 100° C. The temperature gradient established in the stack was about 15° C. as measured between the bipolar plates associated with cells 2 and 9. The heater was turned off and the stack was force cooled to 20° C. The stack was then moved to a freezer at −15° C. without undergoing any additional conditioning steps (e.g. purging before freezing).

Figure 4:
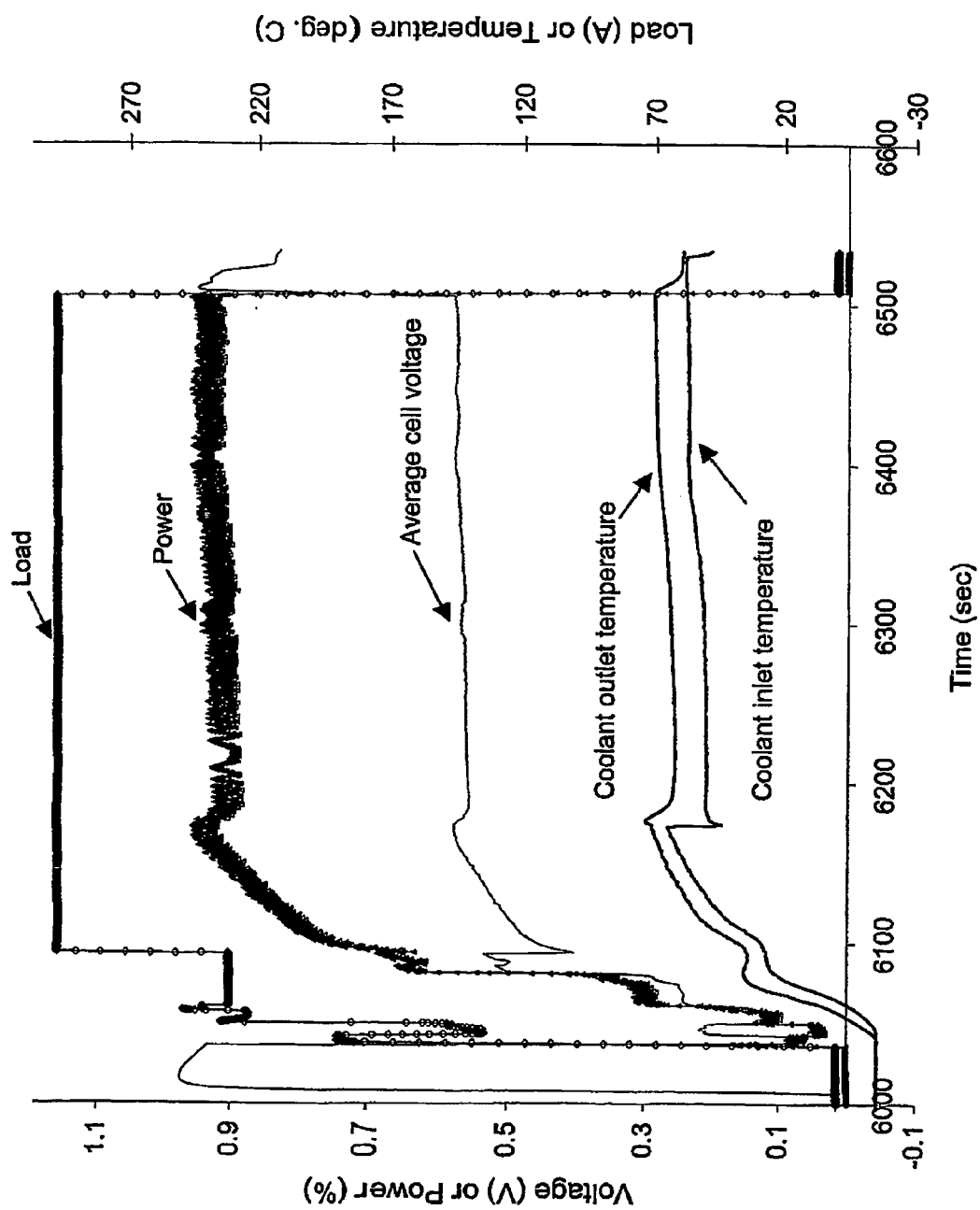
FIG. 4 shows the various parameters recorded during the startup of the fuel cell stack of Example 5.

The stack was then started up from this freezing condition and achieved 50% power level in 45 seconds. Several parameters (average cell voltage, % of total stack power, load, the temperature at the coolant inlet, and the temperature at the coolant outlet) were recorded during the startup period as a function of time and are shown in FIG. 4. Comparative stacks, that have been cooled in a conventional manner after shutdown, take substantially longer to achieve this power level during startup.

This Example demonstrates that the method of the invention is effective in a practical SPE fuel cell stack.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method of shutting down a fuel cell stack having at least two fuel cells stacked in series, each fuel cell having a cathode side and an anode side, the method comprising:
    stopping the generation of electricity from the stack;
    allowing the stack to cool over a cooldown period; and
    maintaining a temperature difference between the cathode side and the anode side of each fuel cell during the cooldown period, wherein the direction of the temperature difference in each fuel cell is the same and wherein water collects at a cooler side of each fuel cell.

2. The method of claim 1 wherein the cathode side is hotter than the anode side in each fuel cell during the cooldown period.

3. The method of claim 1 wherein the anode side is hotter than the cathode side in each fuel cell during the cooldown period.

4. The method of claim 1 wherein the stack is a solid polymer electrolyte fuel cell stack.

5. The method of claim 1 wherein the stack comprises a plurality of fuel cells stacked in series.

6. The method of claim 1 wherein the temperature profile between the ends of the stack is sawtooth shaped during the cooldown period and wherein each tooth in the sawtooth shape corresponds to the temperature profile across a single fuel cell.

7. The method of claim 6 wherein each fuel cell is thermally insulated from adjacent fuel cells in the stack.

8. The method of claim 7 wherein the stack further comprises coolant channels having thermal insulating liners on one side of the channels between adjacent fuel cells in the stack.

9. The method of claim 1 wherein the stack further comprises a hot end and a cold end and wherein the temperatures of the fuel cells decrease monotonically between the hot end and the cold end during the cooldown period.

10. The method of claim 9 wherein the hot end of the stack is thermally insulated.

11. The method of claim 9 further comprising heating the hot end of the stack.

12. The method of claim 9 further comprising cooling the cold end of the stack.

13. The method of claim 1 wherein the temperature difference between the cathode side and the anode side of each fuel cell at the start of the cooldown period is greater than 1° C. per fuel cell.

14. The method of claim 1 wherein the temperature of the stack prior to the cooldown period is greater than about 70° C.

15. The method of claim 14 wherein the temperature of the stack after the cooldown period is less than about 40° C.

16. The method of claim 1 wherein each fuel cell comprises cathode and anode reactant flow fields and the reactant flow fields are not purged during the cooldown period.

17. The method of claim 1 wherein each fuel cell comprises cathode and anode reactant flow fields and the colder reactant flow field in each fuel cell is purged during the cooldown period.

18. A fuel cell system comprising a fuel cell series stack having at least two fuel cells stacked in series, each fuel cell having a cathode side and an anode side, and means for shutting down the stack according to the method of claim 1.

19. The fuel cell system of claim 18 wherein the stack further comprises coolant channels having thermal insulating liners on one side of the channels between adjacent fuel cells in the stack.

20. The fuel cell system of claim 18 wherein the stack further comprises at least one Peltier device between a pair of cells in the stack.

* * * * *